Patented July 1, 1930

1,769,208

UNITED STATES PATENT OFFICE

THOMAS C. CROWLEY, OF BIRMINGHAM, ALABAMA, ASSIGNOR OF ONE-HALF TO E. B. IRWIN, OF BIRMINGHAM, ALABAMA

CONTRACTION-EXPANSION JOINT AND METHOD OF MAKING THE SAME

No Drawing.    Application filed July 31, 1928. Serial No. 296,630.

This invention relates to joints which must compensate for both contraction and expansion, such as those in pavements or roadways, and a method of making them. More specifically, it relates to a composition of matter utilizable for such joints and the method of mixing or incorporating the materials.

Many previous types of joints are known using various materials with little or no success. These all are subject to defects in one or more respects as evidenced by the lack of general adoption. Such materials as reclaimed rubber, mineral or vegetable matters, felt, clay, etc., with or without the use of plastic binders illustrate the ineffective attempts to produce a satisfactory composition.

Among the objects of my invention therefore are: the provision of a new composition obviating the foregoing defects and presenting advantages peculiar to its construction; the provision of a cheap readily available composition fulfilling all the requirements of such a joint; the provision of a composition containing a bituminous material and a pulpous material; the method of preparing and mixing the materials; and, in general, a new composition and method of making it admirably adapted to fulfill the functions for which such were designed.

As above suggested, my new composition is composed of a bituminous material and a pulpy material without definite internal structure in the form in which it is used. The bituminous material is preferably asphalt, although other bituminous materials, of which there are many, could also be used if desired or found necessary. This asphalt serves as a binder and imparts the needed resiliency and water-proofness desired The pulpous structureless material is best prepared from cotton stalks and the preferred embodiment of my invention makes use of this material.

After the cotton is picked from the cotton stalks, the latter constitutes hitherto useless waste which I thus expediently employ. The cotton stalks as gathered from the fields are put on a conveyor which passes them through a circular saw device, the stalks being thereby cut or sawed into convenient lengths. The conveyor then passes the cut stalks between rollers travelling at different speeds, one or both of which may be knurled to increase the disintegrating action of the rollers. The material next passes into a hammer mill, preferably one of centrifugal type, which has a vibrating screen associated therewith, the whole being so arranged that the finer material passes along into the remainder of the process whereas the heavier coarser material is shunted off for further or re-treatment as above described. The above actions produce a pulpy material without definite internal structure from the cotton stalks.

Previously warmed or liquefied asphalt, rendered flowable, passes into a rotary steam-jacketed mixer where the pulpous material then passes to meet it. The two are very thoroughly mixed therein and forced out at the other end in a compact mass which then passes to treating rollers which roll, lubricate, and cut it in a desired manner.

There is thus produced a homogeneous composition of asphalt and cotton stalks, the asphalt being the binder and the cotton stalks the filler. Due to the nature of the prepared cotton stalks and the method of mixing them with the asphalt, an unexpectedly admirable composition is produced, performing exactly as needed and providing a cheap excellent joint material finding great favor.

The uses of this composition are manifold and the composition may be varied to suit the occasion. The percentage of cotton stalks is large whereas prior compositions use only small amounts of the clays, etc. The cotton stalks may run as high as 75 percent but may range from about 40–75 percent. The asphalt thus ranges from about 60–25 percent.

It is noted that the asphalt penetrates the pulpous filler thus yielding a peculiarly efficient long-wearing product. The asphalt being waterproof endows the composition with this quality.

A modification of the composition contains a small amount of a copper salt, such as copper sulphate. The amount of this salt may run from a trace up to about 2 percent or even more. This toughens and hardens the composition increasing wear and preventing decay. It is also poisonous to plant growths and prevents such adjacent to or in the composition.

The copper sulphate may be added in any suitable or convenient manner. It can be used either in a solid form or in solution and it is immaterial as to the final results in exactly which form it is incorporated into the composition.

If desired, one or more of the rollers can be provided with staggered studs. Thus rows of staggered depressions are formed on the surface of the composition. The rows on opposite sides are also offset. This gives a composition having compressed places which increase strength and wear of the material. These depression may also have a further function. In using the joint, a strip is inserted between the adjacent ends of the concrete pavement or road section, the strip being slightly projecting above the road surface. This protuberance is then cut off and hot pitch poured on the joint. This seeps down and flows partially or wholly into the depressions thus securely anchoring it.

The above description is intended to be more illustrative than limitative so that I do not limit myself thereto except as contained in the subjoined claims.

Having thus described my invention and illustrated its use, what I claim as new and desire to secure by Letters Patent of the United States is:

1. A composition of matter consisting of a homogeneous mixture of asphalt, cotton stalks, and copper sulphate.

2. A contraction-expansion joint strip consisting of a homogeneous mixture of asphalt, cotton stalks, and copper sulphate, the opposite sides of the strip being provided with offset rows of staggered depressions.

3. A contraction-expansion joint containing cotton stalks reduced to a pulpy state, a bituminous material such as asphalt and copper sulphate, the three being incorporated together to form a homogeneous mixture.

4. The process of forming a composition for a contraction-expansion joint including the steps of incorporating in intimate admixture asphalt, cotton stalks, and copper sulphate.

5. The process of forming a composition for a contraction-expansion joint including the steps of incorporating in intimate admixture asphalt and cotton stalks, simultaneously adding copper sulphate.

6. The process of forming a composition for a contraction-expansion joint consisting of the steps of sawing cotton stalks into appropriate lengths, reducing the same to a structureless pulp and incorporating asphalt therewith, simultaneously adding copper sulphate.

7. The process of forming a composition for a contraction-expansion joint including the steps of sawing cotton stalks into appropriate lengths, macerating and hammering them into a structureless pulp, liquefying asphalt, and thoroughly mixing the two into a homogeneous mass, adding copper sulphate to the mixture, and then rolling and cutting the same.

In testimony whereof I affix my signature.

THOMAS C. CROWLEY.